United States Patent
Finley et al.

(10) Patent No.: US 12,481,869 B1
(45) Date of Patent: Nov. 25, 2025

(54) MACHINE LEARNING SYSTEMS FOR PREDICTING UNENROLLMENT IN CLAIMS PROCESSING

(71) Applicant: Express Scripts Strategic Development, Inc., St. Louis, MO (US)

(72) Inventors: Morgan J. Finley, St. Louis Park, MN (US); Garret L. Anderson, Arden Hills, MN (US); Nihitha Davis, Bengaluru (IN); Heather Durosko, New Castle, PA (US); Camille Patel, New York, NY (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 624 days.

(21) Appl. No.: 16/923,270

(22) Filed: Jul. 8, 2020

(51) Int. Cl.
| | |
|---|---|
| *G06N 3/08* | (2023.01) |
| *G06F 40/205* | (2020.01) |
| *G06N 3/042* | (2023.01) |
| *G06N 3/044* | (2023.01) |
| *G06N 3/048* | (2023.01) |
| *G06Q 10/10* | (2023.01) |

(Continued)

(52) U.S. Cl.
CPC ............. *G06N 3/08* (2013.01); *G06F 40/205* (2020.01); *G06N 3/042* (2023.01); *G06N 3/044* (2023.01); *G06N 3/048* (2023.01); *G06Q 10/10* (2013.01); *G06Q 40/08* (2013.01); *G16H 20/10* (2018.01); *G16H 40/20* (2018.01)

(58) Field of Classification Search
CPC ...... G06N 3/08; G06N 3/0427; G06N 3/0445; G06N 3/0481; G06F 40/205; G06Q 10/10; G06Q 40/08; G16H 20/10; G16H 40/20
See application file for complete search history.

(56) References Cited

U.S. PATENT DOCUMENTS

| | | | |
|---|---|---|---|
| 10,527,436 B2 | 1/2020 | Fu | |
| 11,437,137 B1 * | 9/2022 | Harris | G06Q 30/04 |

(Continued)

OTHER PUBLICATIONS

Saripalli, Prasad, Venu Tirumala, and Anundhara Chimmad. "Assessment of healthcare claims rejection risk using machine learning." 2017 IEEE 19th International Conference on e-Health Networking, Applications and Services (Healthcom). IEEE, 2017. (Year: 2017).*

*Primary Examiner* — Li B. Zhen
*Assistant Examiner* — Henry Nguyen
(74) *Attorney, Agent, or Firm* — Jordan IP Law PC

(57) ABSTRACT

A machine learning server for trained prediction of unenrollment in claim processing systems is provided. The machine learning server includes a processor configured to construct a layered neural network configured to be trained by claim features. The processor is also configured to receive historic claims. The processor is also configured to extract a set of historic claim features from the historic claim data of the historic claims. The processor is further configured to obtain the claim enrollment status associated with the sets of historic claim features. The processor is also configured to train the layered neural network with the set of historic claim features and the claim enrollment status to predict the claim enrollment status of a pending claim. The processor is further configured to receive a pending claim and to apply the pending claim features to the trained layered neural network to obtain a predicted claim enrollment status.

17 Claims, 8 Drawing Sheets

(51) Int. Cl.
    *G06Q 40/08*     (2012.01)
    *G16H 20/10*     (2018.01)
    *G16H 40/20*     (2018.01)

(56) References Cited

U.S. PATENT DOCUMENTS

| | | | |
|---|---|---|---|
| 2013/0204644 A1* | 8/2013 | Evans | G06Q 10/10 |
| | | | 705/4 |
| 2015/0363557 A1* | 12/2015 | Van Arkel | G06Q 40/08 |
| | | | 705/2 |
| 2016/0203404 A1 | 7/2016 | Cherkasova | |
| 2019/0163500 A1 | 5/2019 | Daianu | |
| 2019/0206521 A1 | 7/2019 | Walpole | |
| 2019/0278976 A1 | 9/2019 | Khadloya | |
| 2019/0294995 A1 | 9/2019 | Pastor Perales | |
| 2020/0004710 A1 | 1/2020 | Peter | |
| 2020/0125659 A1* | 4/2020 | Brisimi | G06N 5/025 |
| 2020/0302296 A1 | 9/2020 | Miller | |
| 2020/0310479 A1 | 10/2020 | Worth | |
| 2020/0320383 A1 | 10/2020 | Dechu | |
| 2021/0141834 A1* | 5/2021 | Mac Manus | G06F 16/906 |
| 2021/0192635 A1* | 6/2021 | Kim | G06N 3/084 |
| 2021/0357316 A1* | 11/2021 | Chang | G06N 20/00 |
| 2022/0114673 A1* | 4/2022 | Shaw | G06Q 30/04 |
| 2022/0147938 A1* | 5/2022 | Sanson Giraldo | G06Q 40/08 |

\* cited by examiner

MACHINE LEARNING SYSTEMS FOR PREDICTING UNENROLLMENT IN CLAIMS PROCESSING

FIELD OF INVENTION

The field relates to machine learning systems using mixed neural networks for training prediction of claim unenrollment in claim processing systems.

BACKGROUND OF THE DISCLOSURE

In claim processing systems, significant technical, operational, and financial resources are used to process and attempt to fulfill claims for medical services such as prescriptions. In many cases, claims cannot be fulfilled despite such efforts and the claim must be "unenrolled" with no benefit provided. As a result, in cases where claim processing fails, the resources that are utilized are lost. Conversely, successful processing of claims provides valuable benefits to claimants, healthcare providers, and insurers. In known claim processing systems, it is often difficult to distinguish between claims that will successfully process and those that will be unenrolled.

Thus, in many claim processing systems, the problem of failed fulfillment (and unenrollment) is of significant concern. Known systems and methods fail to resolve the problem of failed fulfillment because they identify failed fulfillment after it has occurred and the claim is unenrolled. Other known systems bear a significant risk of inaccurately designating a claim that may process as one that will be unenrolled. Because of the significant benefits associated with successful claim processing, such over-inclusive approaches bear significant risks.

Further, although review of claims may be used by comparing processing claims to static profiles of claims that failed to be fulfilled, such approaches are limited because the nature of claim data is constantly changing making it impossible to identify possible unenrollment using such techniques. A robust solution is desired that can predict claims that may be unenrolled in a landscape of complex and changing claims data. If claims that are likely to be unenrolled can be predicted, claim processing systems can terminate the processing of such claims, modify the claims, or otherwise avoid wasted resources spent on a claim that cannot be processed.

As such, machine learning systems for predicting claim unenrollment in claim processing systems are desirable.

BRIEF SUMMARY OF THE INVENTION

In one aspect, a machine learning server for trained prediction of unenrollment in claim processing systems is provided. The machine learning server includes a memory for storing data and a processor in communication with the memory. The processor is configured to construct a layered neural network configured to be trained by claim features. The processor is also configured to receive historic claims. Each historic claim includes historic claim data. The historic claim data includes a claim enrollment status of processed or unenrolled. The processor is also configured to extract a set of historic claim features from the historic claim data of each historic claim. The processor is further configured to obtain the claim enrollment status associated with each set of historic claim features from the historic claims. The processor is also configured to train the layered neural network with the set of historic claim features and the claim enrollment status to predict the claim enrollment status of a pending claim. The processor is further configured to receive a pending claim including pending claim data and extract a set of pending claim features from the pending claim data. The processor is also configured to apply the pending claim features to the trained layered neural network to obtain a predicted claim enrollment status.

In another aspect, a method for trained prediction of unenrollment in claim processing systems is provided. The method is performed by a machine learning server including a memory for storing data and a processor in communication with the memory. The method includes constructing a layered neural network configured to be trained by claim features. The method also includes receiving historic claims. Each historic claim includes historic claim data. The historic claim data includes a claim enrollment status of processed or unenrolled. The method further includes extracting a set of historic claim features from the historic claim data of each historic claim. The method also includes obtaining the claim enrollment status associated with each set of historic claim features from the historic claims. The method also includes training the layered neural network with the set of historic claim features and the claim enrollment status to predict the claim enrollment status of a pending claim. The method also includes receiving a pending claim including pending claim data. The method further includes extracting a set of pending claim features from the pending claim data. The method also includes applying the pending claim features to the trained layered neural network to obtain a predicted claim enrollment status.

In yet another aspect, a machine learning system for trained prediction of unenrollment in claim processing systems is provided. The machine learning system includes a claim processing server further including a claim memory and a claim processor in communication with the claim memory. The claim memory is configured to store historic claims and pending claims. The machine learning system also includes a machine learning server including a memory for storing data, and a processor in communication with the memory. The processor is configured to construct a layered neural network configured to be trained by claim features. The processor is also configured to receive historic claims. Each historic claim includes historic claim data. The historic claim data includes a claim enrollment status of processed or unenrolled. The processor is also configured to extract a set of historic claim features from the historic claim data of each historic claim. The processor is further configured to obtain the claim enrollment status associated with each set of historic claim features from the historic claims. The processor is also configured to train the layered neural network with the set of historic claim features and the claim enrollment status to predict the claim enrollment status of a pending claim. The processor is further configured to receive a pending claim including pending claim data and extract a set of pending claim features from the pending claim data. The processor is also configured to apply the pending claim features to the trained layered neural network to obtain a predicted claim enrollment status.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

In the drawings, reference numbers may be reused to identify similar and/or identical elements.

DETAILED DESCRIPTION

Figure 1:
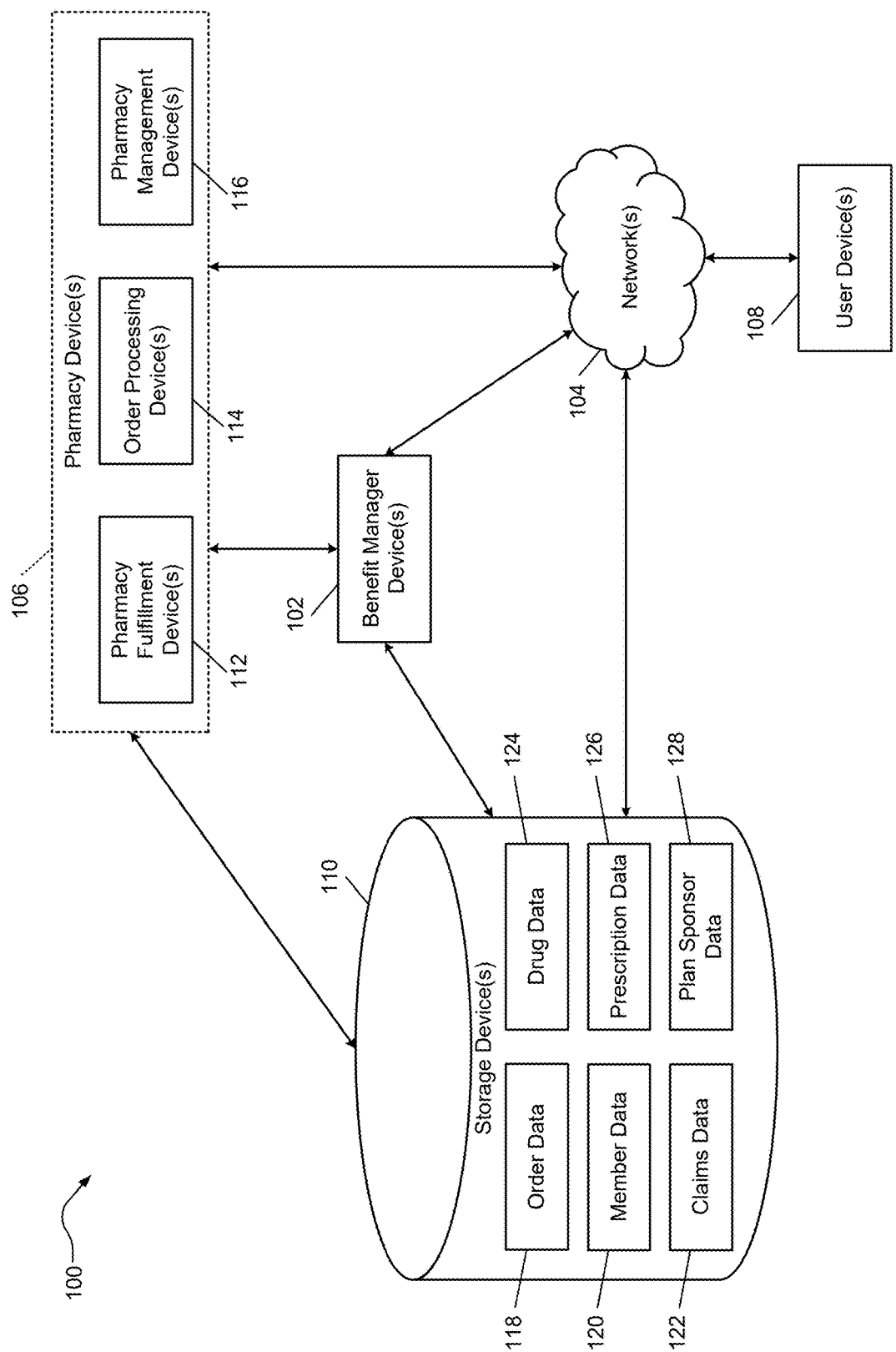
FIG. 1 is a functional block diagram of an example system including a high-volume pharmacy.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

As used herein, the term "feature extraction" or "extraction" refers to the process of selecting a subset of relevant features (e.g., variables or predictors) from a data set that are used in the described machine learning system to predict erroneous or inaccurate data and define data models. Feature extraction or extraction may alternatively be described as variable selection, attribute selection, or variable subset selection. "Features" as used herein, refer to characteristics, components, or elements of data sets. In particular, features may refer to particular characteristics or components of claims. The feature selection process of the machine learning system described herein allows the machine learning system to efficiently predict unenrollment of prescription claims.

As used herein, the term "unenrollment" in claim processing systems refers to a removal of a claim from processing without service provided because the claim data cannot be successfully processed. By contrast, "enrollment" refers to a successful processing of a claim in claim processing systems. In the context of pharmacy benefits, "unenrollment" is associated with a failure to fill a prescription while "enrollment" is associated with a successfully filled prescription.

As used herein, the term "neural network" refers to an artificial neural network or connectionist system in computing systems that is designed based on biological neural networks in animal brains. Generally, neural networks include a collection of connected units or nodes called artificial neurons, which loosely model the neurons in a biological brain. Notably, the neurons can be configured to receive and learn from (or train on) particular information. The neurons can also be grouped or aggregated into "layers" that can perform distinct functions. In some examples, different layers perform different transformations on their inputs. Signals travel from the first layer (the input layer), to the last layer (the output layer). In some cases, the information repeats through the system (i.e., traversing the layers multiple times) before exiting.

As used herein, the term "multilayer perceptron" or "perceptron" or "MLP" refers to a type of neural network (or artificial neural network) within the "feedforward" class of neural networks. Feedforward neural networks are neural networks where connections between the neurons do not form a cycle, and information flows in only one direction—from input nodes through any intermediary hidden layers to output nodes. Thus, feedforward neural networks do not have cycles or loops unlike recurrent neural networks, discussed below. Multilayer perceptron architecture consists of at least three layers of nodes: an input layer, a hidden layer, and an output layer. Except for the input nodes, each node is a neuron that uses a nonlinear activation function. Multilayer perceptron architecture utilizes a supervised learning technique called backpropagation for training. The use of multiple layers and non-linear activation distinguishes multilayer perceptron architecture from a linear perceptron. Multilayer perceptron architecture can distinguish data that is not linearly separable.

As used herein, the term "recurrent neural network" or "RNN" wherein connections between neural nodes form a directed graph along a temporal sequence. This approach allows the RNN to exhibit temporal dynamic behavior. RNNs are related to but distinct from feedforward neural networks. RNNs can use their internal state (memory) to process variable length sequences of inputs. This makes them applicable to tasks such as text comparison, value comparison, and unsegmented, connected handwriting recognition or speech recognition.

As used herein, the term "activation function" refers to a function of a given node in a neural network that defines the output of that node given an input or set of inputs. Described herein are activation functions including "sigmoid activation functions" which are mathematical functions having a characteristic sigmoid (or "S-shaped") curve. Sigmoid activation functions are used in example embodiments of the machine learning systems and neural networks described.

As used herein, the term "binary cross-entropy loss function" describes a function that evaluates the accuracy or inaccuracy of a predictive model. In general, binary cross-entropy measures how far away from the true value (which is either 0 or 1) a prediction is for each of the classes and then averages these class-wise errors to obtain the final loss.

The machine learning systems and methods described herein are configured to address known technological problems in computing systems and networks that process data sets, and more specifically the problems that arise in claim processing systems with unenrollment of pharmacy claims. In particular, in the context of pharmacy claim processing systems, a significant volume of insurance claim submissions cannot be processed and are unenrolled despite a significant operational and financial investment. If claims that are likely to be unenrolled can be predicted, claim processing systems can terminate the processing of such claims, modify the claims, or otherwise avoid wasted resources spent on a claim that cannot be processed. Known systems cannot identify claim submissions that are likely to be unenrolled. As such, machine learning systems and methods are described that address these technical problems with a system for training a layered neural network to identify claims with a high probability for unenrollment, and for applying the trained layered neural network to identify such claims. In at least some embodiments, the layered neural network is a mixed neural network including a recurrent neural network ("RNN") and a multilayer perceptron ("MLP"). In other embodiments, at least one layer of the neural network includes a sigmoid activation function. Known systems may allow for analysis of a set of claim data at a point in time, but become erroneous as the corpus of claim data changes. The systems and methods described are configured to learn from changes in claims data and to avoid such errors. As such, the machine learning systems and methods described overcome known deficiencies in previous technological approaches. Previous known methods involve either the application of static data models which tend to become more inaccurate over time, or utilize manual review which is both inefficient and error prone. Thus, in providing neural networks trained to predict unenrollment and to apply such networks, the systems and methods described propose a technological solution necessarily rooted in computing technology that resolves technological problems.

Thus, to overcome known problems of identifying claims that are likely to be unenrolled, a machine learning system is provided. In an example embodiment, the machine learning system includes a machine learning server that further includes a memory for storing data and a processor in communication with the memory. The machine learning server is also capable of receiving claims from memory or a secondary computing device such as a claim processing server or a data warehouse. Such secondary computing devices include a memory and/or a storage device that stores claims. In all embodiments, whether in the memory of the machine learning server or at a data warehouse or at storage or memory of a secondary computing device (e.g., a claim processing server), the machine learning server is configured to receive claims. More specifically, the machine learning server may receive claims and associated claim data for pending claims (i.e., claims that have not yet been processed), historic claims (i.e., claims that have been previously processed successfully or resulted in unenrollment of the claims), and test claims (i.e., claims that are created based on historic claims, pending claims, or other available claims). As described herein, in most embodiments the machine learning server (a) applies the historic claims to learn and train a data model to predict unenrollment, (b) tests the trained data model using the test claims, and (c) applies the trained and tested data model to the pending claims to predict unenrollment.

To accomplish these steps, the machine learning server utilizes a layered neural network (or a "multilayer neural network") configured to be trained by claim features. As described herein, a "layer" is a group of neurons within a neural network that performs a distinct function from the functions performed by other layers which are composed of other neurons. Specifically, a layer performs a particular set of transformations or functions on received inputs. The machine learning server accordingly constructs a layered neural network configured to be trained by features of claims. The claim features used for training are described below. Similarly, the same claim features are used for testing the trained layered neural network to test the predictive model for unenrollment. Likewise, the same claim features are used for applying to the tested and trained layered neural network.

In at least one embodiment, the layered neural network is a mixed layered neural network composed of different types of neural network layers. "Mixed" as used herein, may also be described as heterogeneous. In at least some embodiments, the mixed layered neural network includes at least one recurrent neural network ("RNN") layer. In other embodiments, the mixed layered neural network includes at least one multilayer perceptron ("MLP") layer. In further embodiments, the mixed layered neural network includes at least one activation layer. The activation layers used may be a sigmoid layer, a rectified linear unit ("ReLU") layer, a softmax layer, a softplus layer, a softsign layer, a tanh layer, a scaled exponential linear unit ("SeLU") layer, an exponential linear unit ("eLU") layer, an exponential unit layer, and any other suitable activation layer. In an exemplary embodiment, the mixed layered neural network includes an RNN layer, a MLP layer, and a sigmoid activation layer. The sigmoid activation layer may be configured in an outer layer (i.e., the final layer of the mixed layered neural network) and configured to determine a probability score indicating a likelihood that a particular claim (e.g., a pending claim upon which the tested and trained mixed layered neural network is applied) is unenrolled. In an example embodiment, the probability score ranges from zero (0) to one (1) wherein a score of zero indicates the lowest likelihood of unenrollment and a score of one indicates the highest likelihood of unenrollment.

In operation, the machine learning server is configured to build a layered neural network. In some examples, the machine learning server applies enough layers to accomplish deep learning. Further, in some examples, the machine learning server creates a mixed layered neural network as described above.

In an example embodiment, the mixed layered neural network is configured to receive input claim features at a layer for pre-processing the features. In some examples, the input claim features include structured and unstructured data. The structured data may include categorical data related to, for example and without limitation, a requestor associated with the claim, a state of residence of the claimant, a category associated with a therapy type for the prescription, a gender and/or sex associated with the claimant, a status indicator related to the sales marketing of the prescription, a status indicator of the pharmacy, a type associated with the insurance provider, a payment term category, an insurer group category, a category of equipment provided with or in association with the prescription, whether prior authorization is required, a primary therapy type associated with the prescription, a dispensing therapy type associated with the prescription, the date of the claim creation, and the date of the prescription. Generally, categorical data in claim data represents definitional information regarding a new claim, information regarding the insurer and prescription, and demographic information regarding the claimant. As this categorical data has defined and finite possible values, the data is inherently structured. As such, the values of the categorized (and structured) data are not processed in a computational (or mathematical) manner, but are instead treated as having meaning based on the categorical definition. During the training of the layered neural network (and, therefore during the training of the model), the machine learning server applies an algorithmic categorical preprocessing step using an embedding layer to encode the categorical values into codes of defined sizes. The algorithmic categorical preprocessing step involves a review of the categorical data values, a determination of the extent of such values (i.e., a determination of all possible values) for each of the categorical data variables, the creation of a dictionary to define such values, encoding with the embedded layer, and applying a reshaping step to scale the values appropriately. During training, each dictionary value is evaluated discretely for relationships to the prediction, rather than continuously. In many examples, the number of dictionary values for each categorical data variable (or field) may be extensive and include thousands or tens of thousands of values. In some examples, there are relatively few. For example, state of residence (or territory of residence), gender and/or sex, status indicators, and whether prior authorization is required each have relatively few values.

The unstructured data may include text and numerical data including information related to the claim. The numerical data may include, without limitation, claimant age, subscriber identifier, amount of unpaid claims, a pricing identifier, a claim center number, a place of service (or point of service). Although the values associated with numerical data may vary extensively, in the example embodiment numeric values are processed as categorical. As such, numeric values are processed within neurons discretely rather than continuously and no mathematic or computational process is applied to such values. Accordingly, the machine learning server may apply the algorithmic numeric preprocessing step to the numerical data in a manner similar to that applied to categorical data. Specifically, during model training, the algorithmic numeric preprocessing step reviews the numerical data, analyzes the extent (or range) of the values for each of the numerical data variables, creates a dictionary to define such values, and encodes and scales the values appropriately. During training, each dictionary value is evaluated discretely for relationships to the prediction, rather than continuously. In some examples, the machine learning server can process the numerical data in a continuous manner rather than a categorical one. In general, the machine learning server processes the numerical data using a dense layer that may further include an embedding layer and a reshaping layer. The range (or extents) of numeric values in the numeric variables can be quite extensive ranging from relatively few options (in the case of places of service numbers) to hundreds of thousands (in the case of claim center numbers).

Text data can vary substantially in the claim data. First, some text variables (or fields) are optional in the claim data and therefore not present in all claims. Second, the text data is "free form" and may vary in length, structure, and format. Text data can include, for example, comments associated with a claim, billing instructions associated with a claim, additional rules or processing requirements associated with a claim, and notes associated with a claim. Accordingly, as the text data is highly complex, the machine learning server applies an algorithmic textual preprocessing step to prepare the text data for analysis and to determine meaning from the text fields. The preprocessing step may include tokenization and/or custom vocabulary creation stages. Tokenization is the process of vectorising a textual corpus by turning each component text into (a) a sequence of integers wherein each integer is the index of a token in a dictionary; and/or (b) a vector wherein the coefficient for each token may be (i) binary, (ii) based on word or character count, and/or (iii) based on algorithms such as term frequency-inverse document frequency. In the example embodiment, the machine learning server specifically uses a recurrent neural network ("RNN") architecture including at least one of a word embedding layer, a long short term memory layer, and a dense layer. The word embedding layer allows the machine learning server to represent similar words or phrases similarly and to thereby derive meaning from words. The word embedding layer may include suitable techniques for representing words as or in vectors in a predefined space. The word embedding layer may include, for example, an inverse document frequency algorithm to identify words of particular significance within the text data. The word embedding layer may also be configured to remove, truncate, or ignore textual information where a text feature is not found to be salient. The long short term memory layer is used to evaluate information in a sequence (here, textual information) and learn from the sequence.

The machine learning server is therefore configured to receive data input and particularly to receive claims that are processed to obtain relevant claim features or data features including the text data, numeric data, and categorized data described. As described, the machine learning server may receive and process pending claims (i.e., claims that have not yet been processed), historic claims (i.e., claims that have been previously processed successfully or resulted in unenrollment of the claims), and test claims (i.e., claims that are created based on historic claims, pending claims, or other available claims). The machine learning server is configured to extract claim features (or features or data features) from each claim type.

In an example embodiment, the machine learning server receives historic claims. At least one of the historic claims includes historic claim data such as the text data, numeric data, and categorized data described above. In some embodiments, each historic claim includes historic claim data. As described herein, historic claims have previously either a) been processed successfully or b) been unenrolled after failed processing. In either event, the historic claims include records associated with either successful processing or unenrollment. As such, the historic claim data includes a claim enrollment status of processed or unenrolled.

The machine learning server is further configured to extract a set of historic claim features from the historic claim data. In some examples, the set of historic claim features are extracted from the historic claim data of each historic claim. In the example embodiment, feature extraction includes parsing the historic claims to identify and obtain historic claim features. (Similarly, the machine learning server is configured to extract claim features from other claims, and therefore extracts pending claim features from pending claims and test claim features from test claims.) In an example embodiment, the claims have a defined layout that can be parsed using suitable queries such as structured query language ("SQL") queries or similar database queries. Such queries may accordingly be written to retrieve claim features. In other examples, the claims may have structural definition using, for example, fixed widths or defined delimiters, and parsed based on those definitions. Accordingly, the machine language server may use a script to retrieve the claim features using, for example, definitional headers. In all examples, the machine learning server has access to necessary data structures that define the claims. In at least one embodiment, the machine learning server receives such definitional structures before or in conjunction with the claims. In another embodiment, the machine learning server is configured with specific queries or scripts to retrieve claim features distinctly, along with the claim enrollment status which is discussed below.

The machine language server is also configured to obtain the claim enrollment status associated with each set of historic claim features from the historic claims. In the example embodiment, the claim enrollment status is included with the claims. (In pending claims, by contrast, the claim enrollment status is either null or not included because it has not yet been determined.) The machine language server accordingly queries or otherwise retrieves the claim enrollment status. The claim enrollment status is either "processed" or "unenrolled". As suggested, a status of "processed" indicates that the claim was normally or successfully processed. "Processed" may also be indicated as "enrolled", "successful", or "fulfilled". As suggested, a status of "unenrolled" indicates that the claim was not successfully processed and was unenrolled. "Unenrolled" may also be indicated as "unsuccessful" or "failed".

As described above, in at least some examples, the machine learning server is configured to pre-process claim data to obtain claim features based on claim data. More specifically, after retrieving each data record within claims (whether historic, pending, or testing), the machine learning server may process the claim data as needed in order to obtain the claim features. In one example, the machine learning server may use appropriate neural network layers such as those identified above. In an example embodiment, dense layers are used for processing numeric claim data. In another embodiment, embedding layers and reshaping layers used for categorical claim data. In a further embodiment, recurrent neural network ("RNN") layers are used for text claim data. In such an example, the RNN architecture may include at least one or a combination of word embedding layers, long short term memory layers, and dense layers. Further, in many examples, the machine learning server may pre-process each and every kind of claim data using embedding layers to encode information contained in each type of data.

Thus, in at least one example, the machine learning server is configured to parse the historic claims to obtain a subset of the historic claim data that is non-categorized data. In some examples, the machine learning server is configured to parse each of the historic claims to obtain the subset of the historic claim data that is non-categorized data. In such an example, the machine learning server is also configured to process the subset of the historic claim data with the recurrent neural network to encode the non-categorized data within a plurality of categories. The machine learning server is additionally configured to obtain a portion of the set of historic features based on the encoded non-categorized data.

The machine learning server is also configured to train the layered neural network with the set of historic claim features and the claim enrollment status to predict the claim enrollment status of a pending claim. More specifically, the machine learning server applies the historic claim features and the claim enrollment status, after any necessary pre-processing, to train the layered neural network. In the example embodiment, the machine learning server uses a mixed neural network of a multilayer perceptron and a recurrent neural network. In at least some examples, the machine learning server trains using an MLP or the RNN. In other examples, other neural network architectures may be used. In the example embodiment, the MLP is configured to concatenate the claim features for processing before training. The MLP is also configured to include at least one dropout layer and at least one dense layer. The MLP may also be configured to use a rectified linear unit ("ReLU") activation layer.

Dropout layers are a method for tuning or adjusting the layered neural network in order to prevent overfitting. By using dropout layers to randomly "close gates" (or ignore parts of the model) in training, the machine learning server forces development of new connections. In one example, the amount of dropout layers and dense layers is configurable. In an example embodiment, there are at least two dropout layers and at least two dense layers used in the MLP.

The machine learning server is also configured to include an activation layer that provides a probability score predicting the likelihood that a given claim will be unenrolled if it is submitted for processing. In the example embodiment, an output sigmoid activation layer provides the probability score. In an example embodiment, the probability score ranges from zero (0) to one (1) wherein a score of zero indicates the lowest likelihood of unenrollment and a score of one indicates the highest likelihood of unenrollment. In other embodiments, other probability scores may be used including ranges from zero (0) to one hundred (100). In further embodiments, scoring may be reversed with the highest value meaning the lowest likelihood of unenrollment.

The machine learning server trains the mixed layered neural network which provides the model for unenrollment. In some examples, the machine learning server trains the mixed layered neural network using a binary cross-entropy function as a loss function. In other examples, other suitable loss functions may be used. The loss function evaluates the accuracy or inaccuracy of the predictive model for predicting unenrollment. The loss function determines how far away from the true value (which is either 0 or 1) a prediction of unenrollment is for each of the classes and then averages these class-wise errors to obtain the final loss. Based on the loss function, the machine learning server cycles repeatedly through the historic claim data before creating a stable model meeting a minimum accuracy requirement. In one example, each completed cycle may be referred to as an "epoch". In one example, the machine learning server is trained until it is at least 90% accurate. In other examples, the machine learning server is trained to 95% or 99% accuracy. In some examples, the machine learning server uses an adaptive learning rate optimization algorithm (also known as an "Adam optimizer") to update the model based on determinations from the loss function.

Thus, in some examples, the machine learning server is also configured to test the model by testing the trained layered neural network. In one example, the machine learning server identifies specific samples of historic claims as test claims. In some examples, the test claims are a subset of the historic claims that are distinct from those used to train the layered neural network. The machine learning server receives a set of test claims. Like other claims, each test claim includes test claim data and further includes a test claim enrollment status. The machine learning server is further configured to extract a set of test claim features from the test claim data of each test claim by retrieving and pre-processing, as necessary, the relevant portions of the testing claim data. The machine learning server is also configured to obtain the test claim enrollment status associated with each set of test claim features from the test claims. The machine learning server is further configured to apply the test claim features to the trained layered neural network to obtain a predicted test claim enrollment status for each test claim. To test the model (and the trained layered neural network), the machine learning server compares the predicted test claim enrollment status to each associated test claim enrollment status to identify discrepancies. As claim enrollment status is typically binary (i.e., there are only two values), discrepancies may be listed as Boolean or binary. If the machine learning server determines that the trained layered neural network is not suitably accurate (i.e., that it falls below a required accuracy level), the machine learning server retrains the layered neural network based on the identified discrepancies until suitable accuracy is met. In some examples, the machine learning server may cycle through training and testing several times until the accuracy requirement is met.

The machine learning server is further configured to apply the model (i.e., the trained layered neural network) to pending claims. Accordingly, the machine learning server receives a pending claim including pending claim data and extracts a set of pending claim features from the pending claim data. The machine learning server extracts the pending claim features in the same manner that it extracted historic claim features and test claim features, excepting that there is no claim enrollment status available for pending claims as they have not been processed. The machine learning server also applies the pending claim features to the trained layered neural network to obtain a predicted claim enrollment status. More specifically, in some embodiments, the machine learning server obtains a probability store from the output layer (i.e., the sigmoid activation layer) of the trained layered neural network for each pending claim.

Based on the probability score, the machine learning server is configured to appropriately manage the processing of each pending claim. If the pending claim has a probability score indicating that the claim is likely to be unenrolled, the machine learning server may reject the pending claim and submit it to a claim editing system for revision. If the pending claim has a probability score indicating that it is likely to be successfully processed, the machine learning server is configured to submit the pending claim for processing by a claim processing server. In other words, upon determining that the pending claim has a predicted claim enrollment status of processed, the machine learning server processes the pending claim. In at least on example, the machine learning server is configured to be overly inclusive in claim processing. Specifically, where a probability score or determination is not clear, the machine learning server may submit a pending claim for processing. In other examples, the machine learning server only submits claims that meet a minimum probability score for processing. In some examples, the minimum probability score may be set externally by, for example, a claim processing server or a user of a claim processing server.

In some examples, the predicted enrollment status is provided as a probability score, as described above. In other examples, the predicted enrollment status is a binary value, a Boolean value, or any other two-value score indicating that the enrollment status is predicted to be either "unenrolled" or "processed".

In at least some examples, the machine learning server is configured to train, test, and apply the layered neural network using a range of claim features. In one example, the machine learning server trains using a therapy type (i.e., the pharmaceutical), a location of service, patient/claimant demographics (i.e., gender, sex, and/or age), and a processing group identifier. In other examples, more features may be used including those described above. In most examples, the machine learning server does not require or use protected health information ("PHI") when it processes and analyzes any information related to the patient/claimant.

In an example embodiment, the machine learning server uses a front end layer of a web server hosted in a cloud service. The front end layer uses an application programming interface ("API") to make requests to obtain the claim data (whether historic, testing, or pending). The machine learning server also includes an endpoint that provides the claim data to the layered neural network. The claim data is then passed through the layered neural network for training, testing, or in application to return a predicted enrollment status and/or a predictive score. In some examples, the machine learning server utilizes an authentication layer that performs identity checks on accessing devices and logging.

Generally, the systems and methods described herein are configured to perform at least the following steps: construct a layered neural network configured to be trained by claim features; receive a plurality of historic claims, at least one historic claim including historic claim data, the historic claim data including a claim enrollment status of processed or unenrolled; extract a set of historic claim features from the historic claim data; obtain the claim enrollment status associated with each set of historic claim features from the historic claims; train the layered neural network with the set of historic claim features and the claim enrollment status to predict the claim enrollment status of a pending claim; receive a pending claim including pending claim data; extract a set of pending claim features from the pending claim data; apply the pending claim features to the trained layered neural network to obtain a predicted claim enrollment status; define the layered neural network to include a sigmoid activation layer; apply the pending claim features to the sigmoid activation layer to determine a probability score indicating a likelihood of the predicted claim enrollment status; define the layered neural network to include at least a recurrent neural network and a multilayer perceptron; parse the historic claims to obtain a subset of the historic claim data that is non-categorized data; process the subset of the historic claim data with the recurrent neural network to encode the non-categorized data within a plurality of categories; obtain a portion of the set of historic features based on the encoded non-categorized data; train the layered neural network using a binary cross-entropy loss function; receive a set of test claims including test claim data, the test claim data including a test claim enrollment status; extract a set of test claim features from the test claim data; obtain the test claim enrollment status associated with the sets of test claim features; apply the test claim features to the trained layered neural network to obtain a predicted test claim enrollment status for each test claim; compare the test claim enrollment statuses to the associated predicted test claim enrollment statuses to identify discrepancies; retrain the layered neural network based on the identified discrepancies; and submit the pending claim for processing upon determining that the pending claim has a predicted claim enrollment status of processed.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
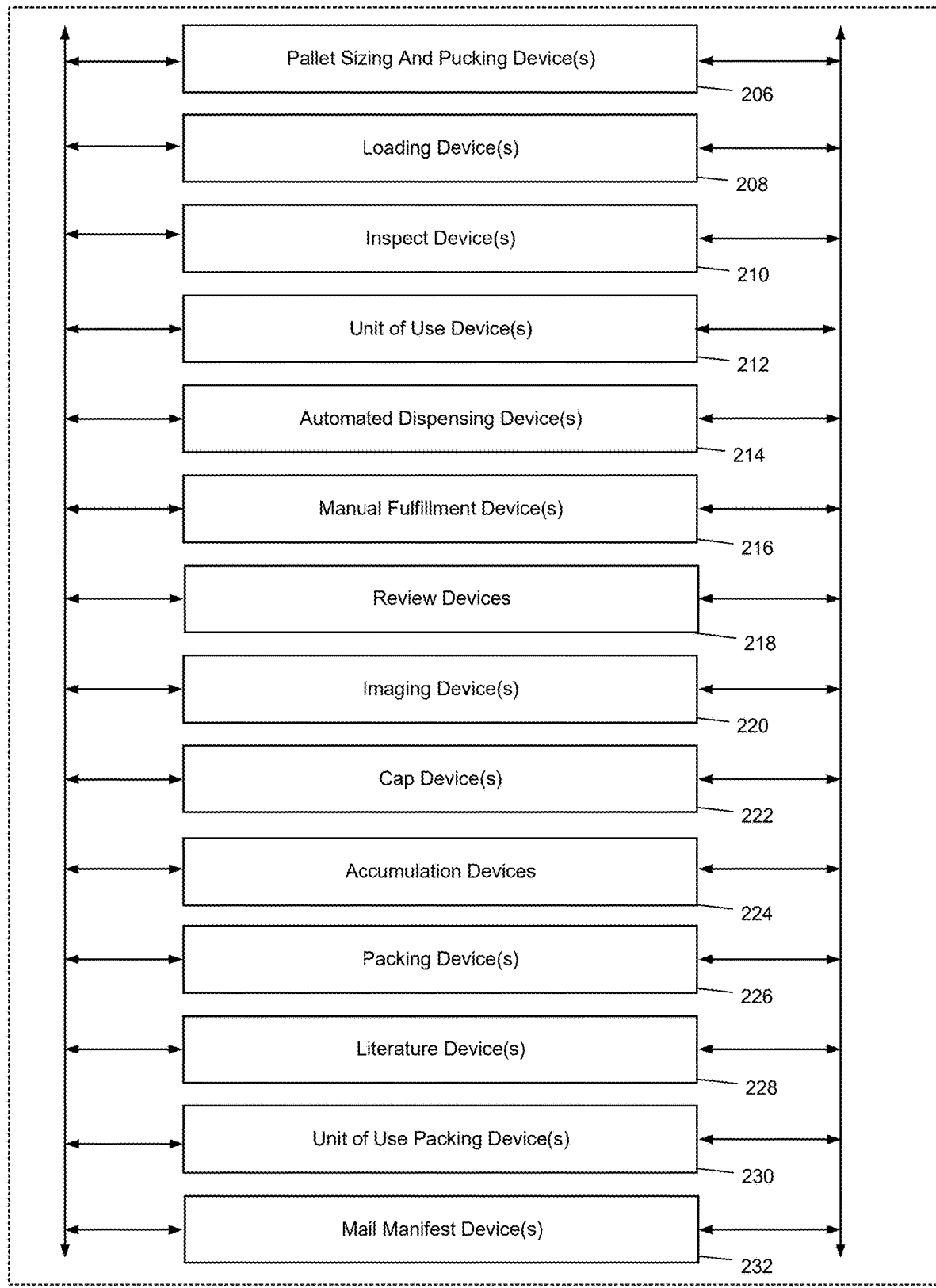
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
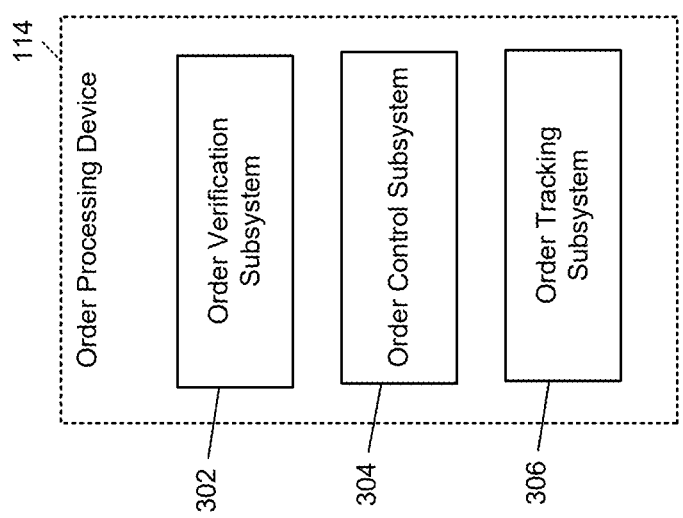
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may include order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Figure 4:
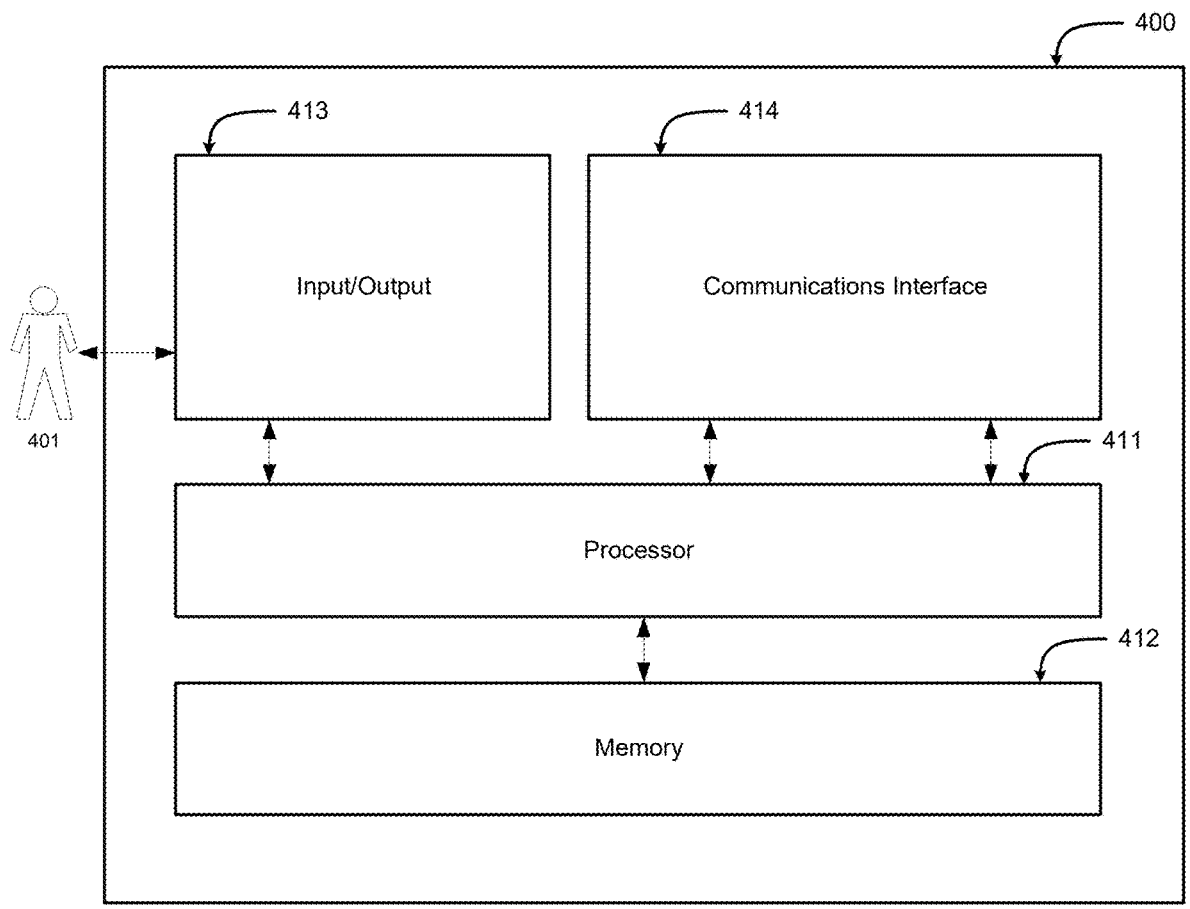
FIG. 4 is a functional block diagram of an example computing device that may be used in the machine learning system described.
Figure 5:
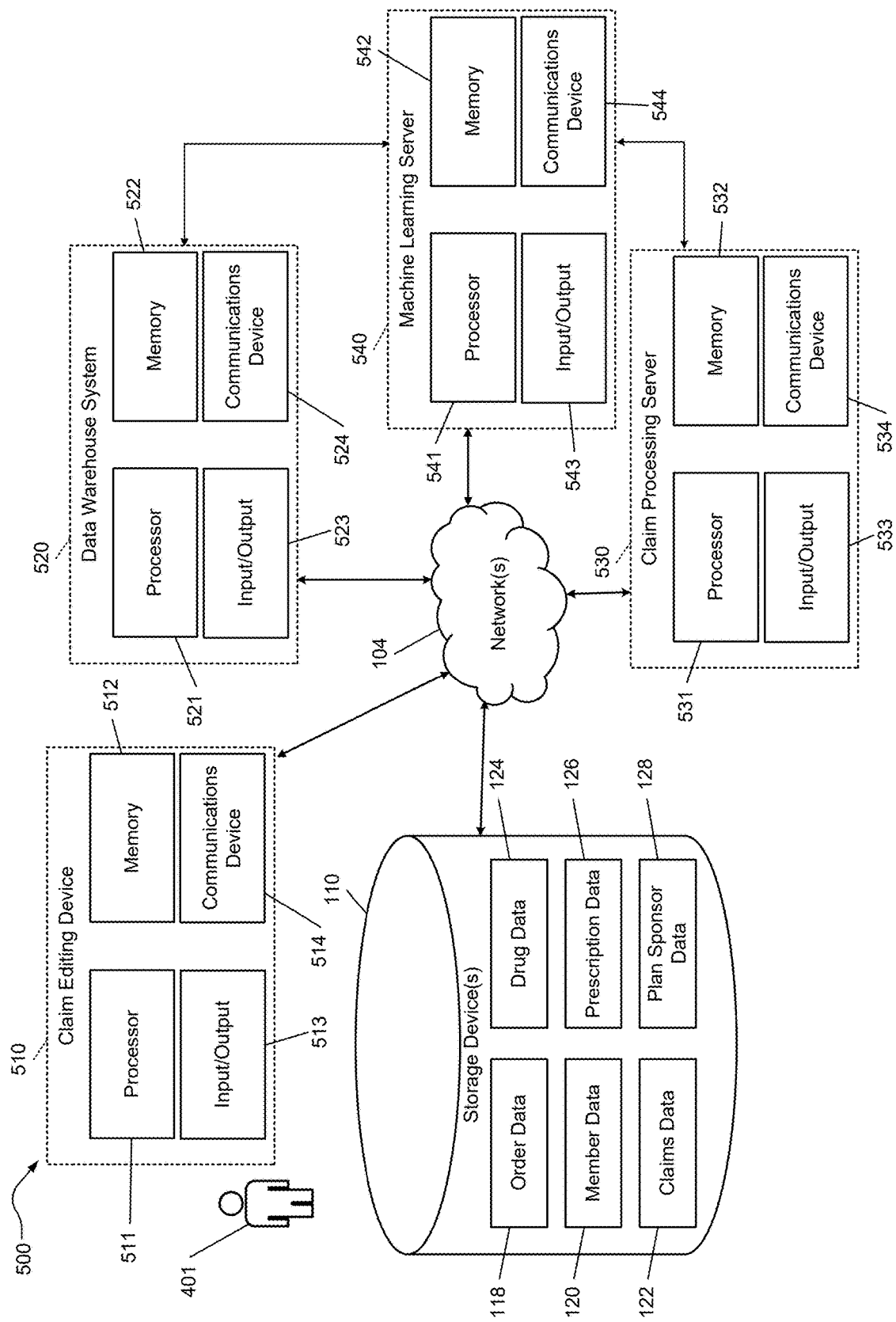
FIG. 5 is a functional block diagram of a machine learning system that may be deployed within the system of FIG. 1 using the computing devices shown in FIG. 4.

FIG. 4 is a functional block diagram of an example computing device 400 that may be used in the machine learning systems described, and may represent the machine learning server, claim processing server, data warehouse system, and claim editing device (all shown in FIG. 5.) Specifically, computing device 400 illustrates an exemplary configuration of a computing device for the systems shown herein, and particularly in FIGS. 1 and 5. Computing device 400 illustrates an exemplary configuration of a computing device operated by a user 401 in accordance with one embodiment of the present invention. Computing device 400 may include, but is not limited to, the machine learning server, claim processing server, data warehouse system, and claim editing device (all shown in FIG. 5), other user systems, and other server systems. Computing device 400 may also include pharmacy devices 106 including pharmacy fulfillment devices 112, order processing devices 114, and pharmacy management devices 116, storage devices 110, benefit manager devices 102, and user devices 108 (all shown in FIG. 1), mobile computing devices, stationary computing devices, computing peripheral devices, smart phones, wearable computing devices, medical computing devices, and vehicular computing devices. Alternatively, computing device 400 may be any computing device capable of the machine learning methods for trained prediction of unenrollment in claim processing systems. In some variations, the characteristics of the described components may be more or less advanced, primitive, or non-functional.

In the exemplary embodiment, computing device 400 includes a processor 411 for executing instructions. In some embodiments, executable instructions are stored in a memory area 412. Processor 411 may include one or more processing units, for example, a multi-core configuration. Memory area 412 is any device allowing information such as executable instructions and/or written works to be stored and retrieved. Memory area 412 may include one or more computer readable media.

Computing device 400 also includes at least one input/output component 413 for receiving information from and providing information to user 401. In some examples, input/output component 413 may be of limited functionality or non-functional as in the case of some wearable computing devices. In other examples, input/output component 413 is any component capable of conveying information to or receiving information from user 401. In some embodiments, input/output component 413 includes an output adapter such as a video adapter and/or an audio adapter. Input/output component 413 may alternatively include an output device such as a display device, a liquid crystal display (LCD), organic light emitting diode (OLED) display, or "electronic ink" display, or an audio output device, a speaker or headphones. Input/output component 413 may also include any devices, modules, or structures for receiving input from user 401. Input/output component 413 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 413. Input/output component 413 may further include multiple sub-components for carrying out input and output functions.

Computing device 400 may also include a communications interface 414, which may be communicatively coupleable to a remote device such as a remote computing device, a remote server, or any other suitable system. Communication interface 414 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 414 is configured to allow computing device 400 to interface with any other computing device or network using an appropriate wireless or wired communications protocol such as, without limitation, BLUETOOTH®, Ethernet, or IEE 802.11. Communications interface 414 allows computing device 400 to communicate with any other computing devices with which it is in communication or connection.

FIG. 5 is a functional block diagram of a machine learning system 500 that may be deployed within the system of FIG. 1 using the computing device 400 (shown in FIG. 4.). As suggested in FIG. 5, the machine learning system 500 may be used in system 100 (shown in FIG. 1) and utilizes some of the same elements including storage device 110, order data 118, member data 120, claims data 122, drug data 124, prescription data 126, plan sponsor data 128, and is in connection to network 104 which can provide interconnection between and among the systems shown in FIG. 5 and the systems shown in FIG. 1. As shown in FIG. 5, machine learning system 500 includes storage device 110 and components 118, 120, 122, 124, 126, and 128, claim editing device 510, data warehouse system 520, claim processing server 530, and machine learning server 540. The computer systems 510, 520, 530, and 540 each have an associated processor 511, 521, 531, and 541, an associated memory 512, 522, 532, and 542, an associated input/output 513, 523, 533, and 543, and an associated communications device 514, 524, 534, and 544. Such components function in a manner substantially similar to those described in computing device 400. Computer systems 510, 520, 530, and 540 are in communication with one another and storage device(s) 110 either directly or through network(s) 104. As described above, in some embodiments computer systems 510, 520, 530, and 540 are in communication with other devices such as those described in FIG. 1 via network(s) 104.

As described above and herein, machine learning system 500 is configured to train a layered neural network to predict enrollment in pending claims using the methods described herein. Significantly, claim processing server 530 and data warehouse system 520 are configured to store and provide the historical claims, testing claims, and pending claims described and provide them to machine learning server 540 which perform the methods described herein. In some examples data warehouse system 520 and/or claim processing server 530 obtain claims (including the historical claims, testing claims, and pending claims) from storage device 110 and, in some examples, from claims data 122. In other examples, data warehouse system 520 and/or claim processing server 530 are substantially integrated with storage device 110. In many embodiments, claim processing server 530 is configured to solely store the historic, testing, and pending claims described and provide them to machine learning server 540. In some examples, claim processing server 530 obtains historic, testing, and pending claims from storage device 110, and in some examples, from claims data 122. In other examples, claim processing server 530 is substantially integrated with storage device 110. In further examples, data warehouse system 520 and/or claim processing server 530 generate testing claims defined or created based on historic claims, such that claim enrollment status relationships to claim features are persistent. As described, machine learning server 540 performs the training, testing, and predictive methods described and, as applicable, provides output to other systems including claim editing device 510. Claim editing device 510 represents a user terminal that allows an individual user to review claims and be alerted regarding potential claim unenrollment (along with a predicted enrollment status and/or probability score). Claim editing device 510 allows a user or the system to refine claims that are sent to it.

Notably, although machine learning system 500 illustrates systems 510, 520, 530, and 540 as distinct, in some examples they may be integrated with one another. In at least some embodiments, systems 520, 530, and 540 are integrated into a single system capable of performing the processes described herein.

Figure 6:
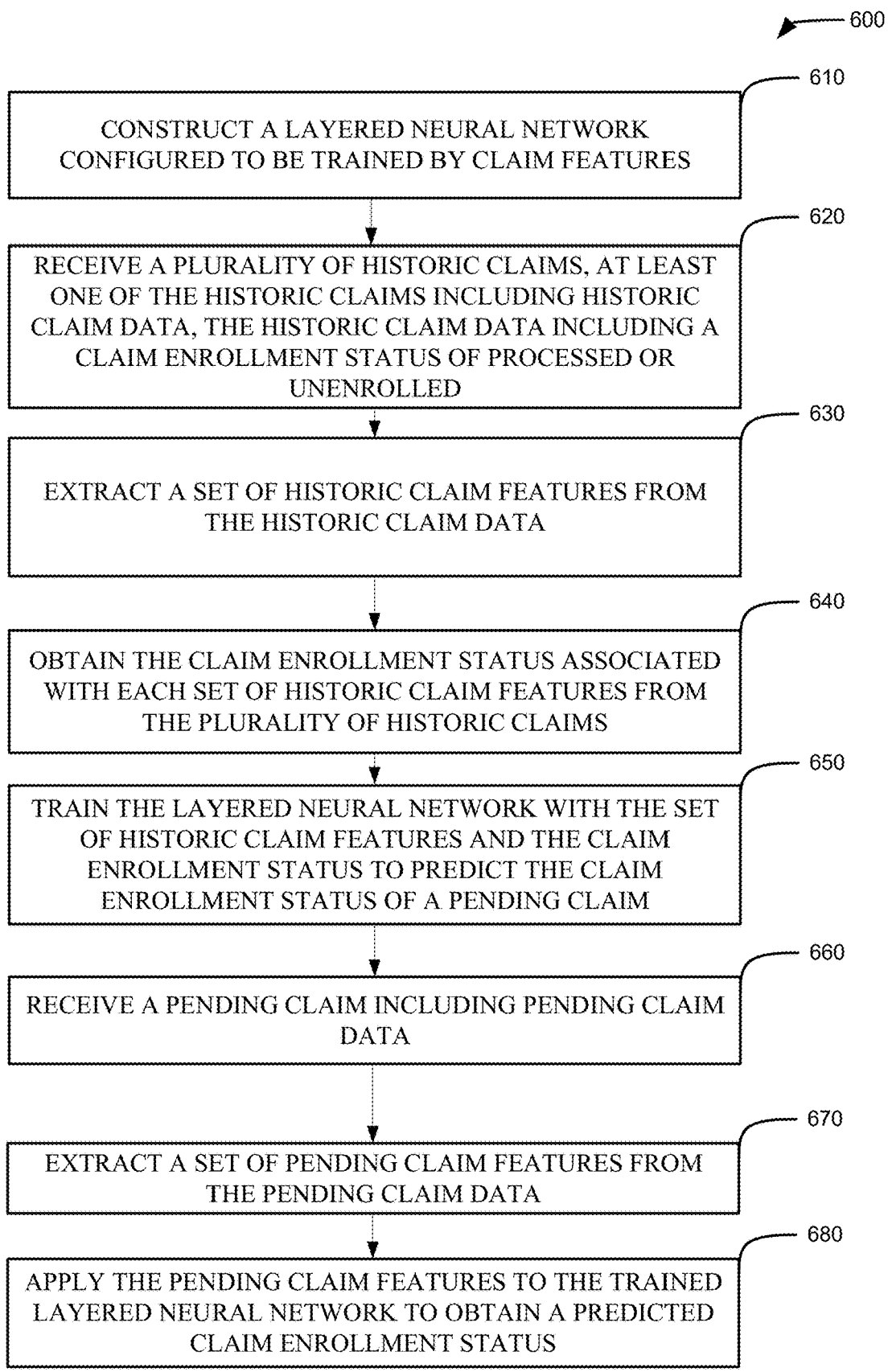
FIG. 6 is a flow diagram representing the process of the trained prediction of unenrollment from the perspective of the claim analysis device shown in FIG. 5.

FIG. 6 is a flow diagram 600 representing the process of training and using a layered neural network to predict claim unenrollment described from the perspective of the machine learning server 540 (shown in FIG. 5.) Flow diagram 600 depicts the exemplary steps that are executed by machine learning server 540 in the context of machine learning system 500 (shown in FIG. 5).

In the example embodiment, machine learning server 540 constructs 610 a layered neural network configured to be trained by claim features. Machine learning server 540 also receives 620 a plurality of historic claims. Each historic claim includes historic claim data and the historic claim data including a claim enrollment status of processed or unenrolled. Machine learning server 540 additionally extracts 630 a set of historic claim features from the historic claim data of each historic claim. Machine learning server 540 also obtain 640 the claim enrollment status associated with each set of historic claim features from the historic claims. Machine learning server 540 additionally trains 650 the layered neural network with the set of historic claim features and the claim enrollment status to predict the claim enrollment status of a pending claim. Machine learning server 540 also receives 660 a pending claim including pending claim data. Machine learning server 540 additionally extracts 670 a set of pending claim features from the pending claim data. Machine learning server 540 also applies 680 the pending claim features to the trained layered neural network to obtain a predicted claim enrollment status.

Figure 7:
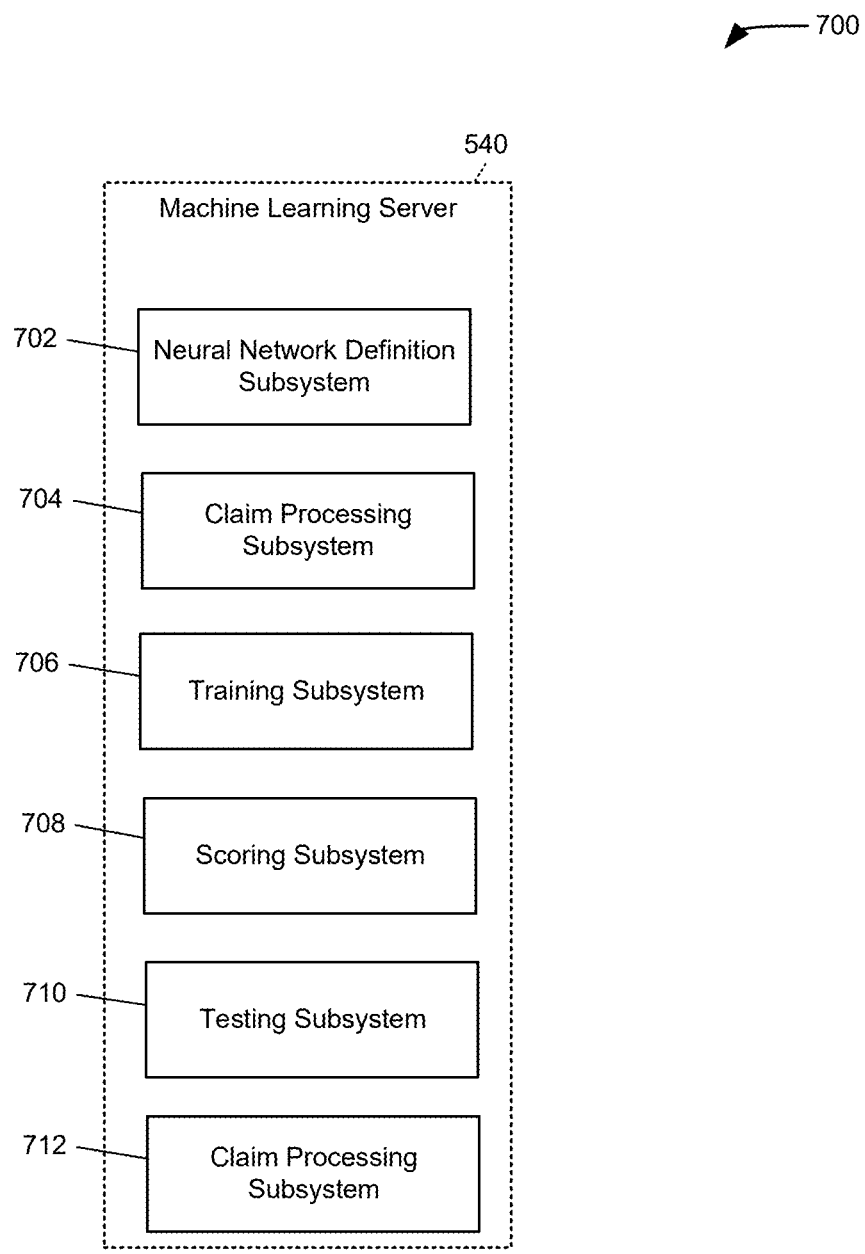
FIG. 7 is a diagram of elements of one or more example computing devices that may be used in the system shown in FIGS. 1 and 5.

FIG. 7 is a diagram 700 of elements of one or more example computing devices that may be used in the system shown in FIGS. 1 and 5. Specifically, FIG. 7 describes subsystems available to machine learning server 540 capable of providing the functionality described herein. Machine learning server 540 includes a neural network definition subsystem 702 which allows machine learning server 540 to construct, define, and refine the layered neural networks described according to various embodiments. In some examples, neural network definition subsystem 702 allows machine learning server 540 to create a mixed layered neural network including MLP layers, RNN layers, sigmoid activation layers, ReLU layers, deep layers, embedding layers, long short term memory layers, dropout layers, and dense layers. Machine learning server 540 also includes a claim processing subsystem 704 configured to allow the server to receive claims (for historic, training, and pending claims), retrieve or identify claim data, and preprocess such claim data to obtain claim features (for historic, training, and pending claims) used to train, test, or use the layered neural network. Claim processing subsystem 704 is further configured to allow machine learning server 540 to obtain the associated claim enrollment status for historic and testing claims. Machine learning server 540 additionally includes a training subsystem 706 used to apply the claim feature and claim enrollment status data to train the layered neural network as described herein. Machine learning server 540 also includes a scoring subsystem 708 used to provide a predicted enrollment status and/or probability score at the output activation layer. Machine learning server 540 is further configured to include a testing subsystem 710 used to test the trained layered neural network. Machine learning server 540 also includes a claim processing subsystem 712 used to either a) submit pending claims for processing upon determining that they have a corresponding predicted enrollment status and/or probability score indicating the claim is predicted to successfully process or b) transmit pending claims to a claim editing device upon determining that the predicted enrollment status and/or probability score indicates that the claim is predicted to unenroll.

Figure 8:
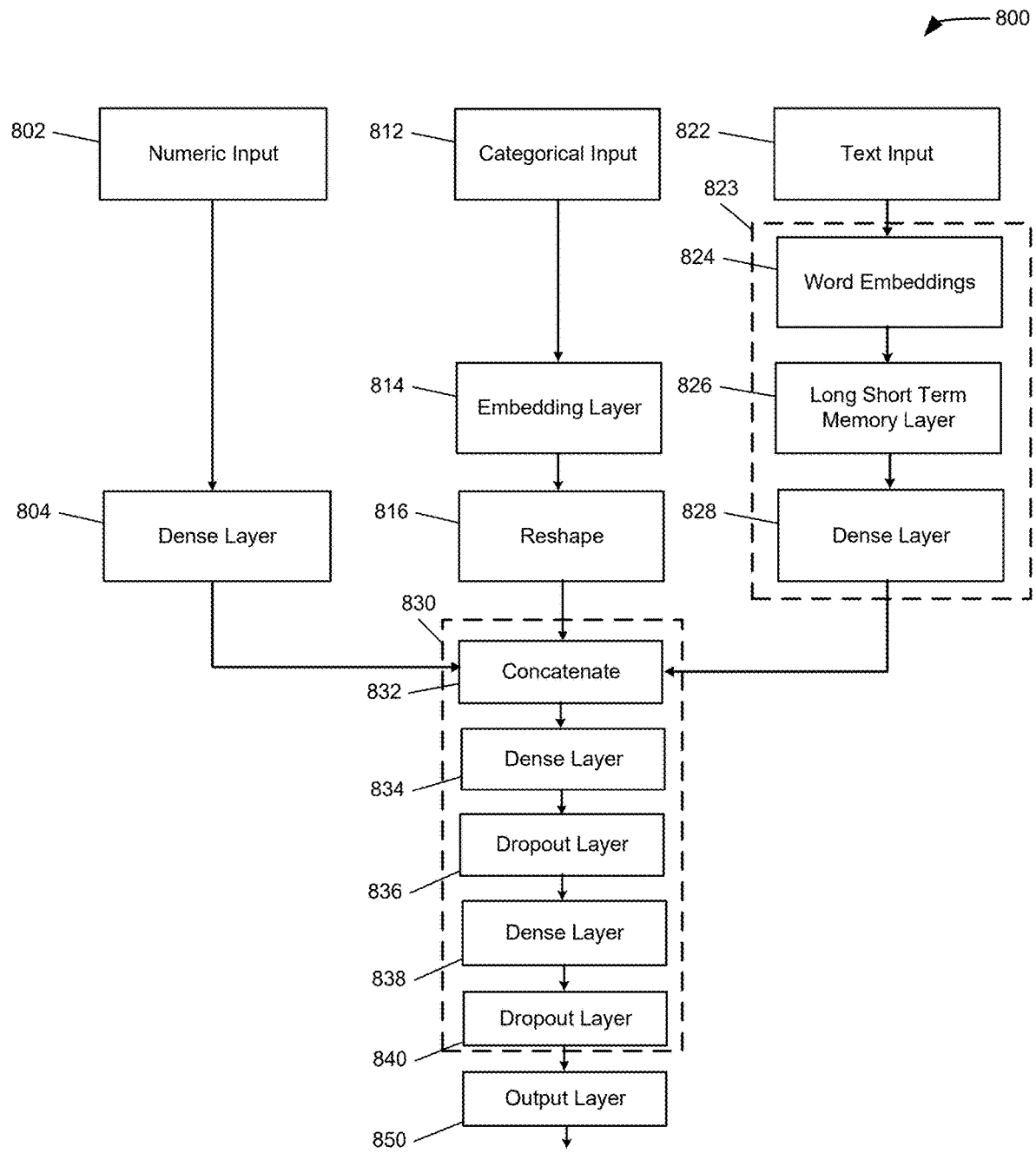
FIG. 8 is a diagram illustrating one embodiment of the layered neural network used for the trained prediction of unenrollment in the machine learning system of FIG. 5.

FIG. 8 is a diagram 800 illustrating one embodiment of the layered neural network used for the trained prediction of unenrollment in the machine learning system of FIG. 5. As described above and herein, the layered neural network is configured to receive at least three types of data, numeric data inputs 802, categorical data inputs 812, and text data inputs 822. Each of data inputs 802, 812, and 822 may be pre-processed before use in training. In the example embodiment, numeric data inputs 802 are applied to a dense layer 804 and, in some embodiments, encoded for categorical analysis on a discrete basis. Specifically, the algorithmic numeric preprocessing step reviews the numerical data inputs 802, analyzes the extent (or range) of the values for each of the numerical data variables, creates a dictionary to define such values, and encodes and scales the values appropriately. During training, each dictionary value is evaluated discretely for relationships to the prediction, rather than continuously. In some examples, the machine learning server can process the numerical data in a continuous manner rather than a categorical one. Categorical data inputs 812 are applied to embedding layer 814 and reshaping layer 816. As such, categorical data inputs 812 are modified with an algorithmic categorical preprocessing step that involves a review of the categorical data values, a determination of the extent of such values (i.e., a determination of all possible values) for each of the categorical data variables, the creation of a dictionary to define such values, encoding with the embedded layer, and applying a reshaping step to scale the values appropriately. During training, each dictionary value is evaluated discretely for relationships to the prediction, rather than continuously. In many examples, the number of dictionary values for each categorical data variable (or field) may be extensive and include thousands or tens of thousands of values. In some examples, there are relatively few. For example, state of residence (or territory of residence), gender and/or sex, status indicators, and whether prior authorization is required each have relatively few values. Text data input 822 is likewise preprocessed in the manner described above. As the text data is highly complex, the machine learning server 540 applies an algorithmic textual preprocessing step to prepare the text data input 822 for analysis and to determine meaning from the text fields. In the example embodiment, the machine learning server 540 specifically uses a recurrent neural network ("RNN") architecture 823 including at least one of a word embedding layer 824, a long short term memory layer 826, and a dense layer 828. The word embedding layer 824 allows the machine learning server 540 to represent similar words or phrases similarly and to thereby derive meaning from words. The word embedding layer 824 may include suitable techniques for representing words as or in vectors in a predefined space. The word embedding layer 824 may include, for example, an inverse document frequency algorithm to identify words of particular significance within the text data. The word embedding layer 824 may also be configured to remove, truncate, or ignore textual information where a text feature is not found to be salient. The long short term memory layer 826 is used to evaluate information in a sequence (here, textual information) and learn from the sequence. The dense layer 828 is used to further categorize and encode the text data input 822.

The processed numeric data input 802, categorical data input 812, and text data input 822 are combined and submitted to the training layers 830. In the example embodiment, training layers 830 use an MLP architecture and/or an RNN architecture. The training layers 830 concatenate 832 the data features and process them through a series of dense layers 834 and 838 and dropout layers 836 and 840. In some examples, the dense layers and dropout layers are interleaved as shown in FIG. 8. In other examples, they are grouped together. Upon processing the data features through the deep and dropout layers, the neural network processes the information through a final output layer 850. In the example embodiment, output layer 850 is a sigmoid activation layer capable of providing a predicted enrollment status and/or probability score.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A machine learning server for trained prediction of unenrollment in claim processing systems, said machine learning server comprising:
a memory for storing data; and a processor in communication with the memory, said processor configured to:
construct a layered neural network configured to be trained by claim features;
receive a plurality of historic claims, at least one of the historic claims including historic claim data, the historic claim data including a claim enrollment status of enrolled or unenrolled;
extract a set of historic claim features from the historic claim data;
determine the claim enrollment status that is associated with the set of historic claim features;
train the layered neural network with the set of historic claim features and the claim enrollment status such that the trained layered neural network is configured to predict a claim enrollment status of a another claim;
receive a pending claim including pending claim data, wherein the pending claim lacks a claim enrollment status as the pending claim has not been processed by a claim processing server;
extract a set of pending claim features from the pending claim data;
apply the pending claim features to the trained layered neural network to determine a predicted claim enrollment status for the pending claim, wherein the predicted claim enrollment status is determined to be one of an enrolled status, an unenrolled status, or a not clear status, wherein the unenrolled status is associated with a failure to fill a prescription of the pending claim while the enrolled status is associated with a successful fulfillment of the prescription;
determine whether to fulfill the pending claim based on the predicted claim enrollment status;
on condition that the predicted claim enrollment status is determined to be the enrolled status, automatically submit the pending claim for processing by the claim processing server for fulfilling the pending claim;
on condition that the predicted claim enrollment status is determined to be the unenrolled status, automatically reject the pending claim; and
on condition that the predicted claim enrollment status is determined to be the not clear status, automatically submit the pending claim for processing by the claim processing server for fulfilling the pending claim,
define the layered neural network to include at least a recurrent neural network and a multilayer perceptron, wherein the set of pending claim features includes a therapy type, a location of service and claimant demographics.

2. The machine learning server of claim 1, wherein the processor is further configured to:
define the layered neural network to include a sigmoid activation layer; and
apply the pending claim features to the sigmoid activation layer to determine a probability score indicating a likelihood of the predicted claim enrollment status, wherein the trained layered neural network is configured to determine the predicted claim enrollment status based on the likelihood of the predicted claim enrollment status.

3. The machine learning server of claim 2, wherein the processor is further configured to:
on condition that the predicted claim enrollment status is determined to be the unenrolled status and the probability score satisfies a predetermined threshold for processing, automatically submit the pending claim to a claim editing system for revision.

4. The machine learning server of claim 2, wherein the processor is further configured to automatically submit the pending claim for processing on condition that the predicted claim enrollment status is determined to be the not clear status on an initial request and the probability score satisfies a predetermined threshold.

5. The machine learning server of claim 1, wherein the processor is further configured to:
parse the historic claims to obtain a subset of the historic claim data that is non-categorized data;
process the subset of the historic claim data with the recurrent neural network to encode the non-categorized data within a plurality of categories; and
obtain a portion of the set of historic claim features based on the encoded non-categorized data.

6. The machine learning server of claim 1, wherein the processor is further configured to:
train the layered neural network using a binary cross-entropy loss function that evaluates an accuracy of the trained layered neural network.

7. The machine learning server of claim 1, wherein the processor is further configured to:
receive a set of test claims including test claim data, the test claim data including test claim enrollment statuses as the set of test claims has been processed by the claim processing server;
extract a set of test claim features from the test claim data;
obtain the test claim enrollment statuses associated with the set of test claim features;
apply the test claim features to the trained layered neural network to determine a predicted test claim enrollment status for each test claim;
compare the test claim enrollment statuses to the associated predicted test claim enrollment statuses to identify discrepancies; and
retrain the layered neural network based on the identified discrepancies.

8. A method for trained prediction of unenrollment in claim processing systems performed by a machine learning server including a memory for storing data and a processor in communication with the memory, said method comprising:
constructing a layered neural network configured to be trained by claim features;

receiving a plurality of historic claims, at least one of the historic claims including historic claim data, the historic claim data including a claim enrollment status of enrolled or unenrolled;

extracting a set of historic claim features from the historic claim data;

determining the claim enrollment status that is associated with the set of historic claim features;

training the layered neural network with the set of historic claim features and the claim enrollment status such that the trained layered neural network is configured to predict a claim enrollment status of another pending claim;

receiving a pending claim including pending claim data, wherein the pending claim lacks a claim enrollment status as the pending claim has not been processed by a claim processing server;

extracting a set of pending claim features from the pending claim data;

applying the pending claim features to the trained layered neural network to determine a predicted claim enrollment status for the pending claim, wherein the predicted claim enrollment status is determined to be one of an enrolled status, an unenrolled status, or a not clear status, wherein the unenrolled status is associated with a failure to fill a prescription of the pending claim while the enrolled status is associated with a successful fulfillment of the prescription;

determining whether to fulfill the pending claim based on the predicted claim enrollment status;

on condition that the predicted claim enrollment status is determined to be the enrolled status, automatically submitting the pending claim for processing by the claim processing server for fulfilling the pending claim;

on condition that the predicted claim enrollment status is determined to be the unenrolled status, automatically rejecting the pending claim; and on condition that the predicted claim enrollment status is determined to be the not clear status, automatically submitting the pending claim for processing by the claim processing server for fulfilling the pending claim, defining the layered neural network to include at least a recurrent neural network and a multilayer perceptron, wherein the set of pending claim features includes a therapy type, a location of service and claimant demographics.

9. The method of claim 8, further comprising:

defining the layered neural network to include a sigmoid activation layer; and applying the pending claim features to the sigmoid activation layer to determine a probability score indicating a likelihood of the predicted claim enrollment status, wherein the trained layered neural network is configured to determine the predicted claim enrollment status based on the likelihood of the predicted claim enrollment status.

10. The method of claim 8, further comprising:

parsing the historic claims to obtain a subset of the historic claim data that is non-categorized data;

processing the subset of the historic claim data with the recurrent neural network to encode the non-categorized data within a plurality of categories; and obtaining a portion of the set of historic claim features based on the encoded non-categorized data.

11. The method of claim 8, further comprising:

training the layered neural network using a binary cross-entropy loss function that evaluates an accuracy of the trained layered neural network.

12. The method of claim 8, further comprising:

receiving a set of test claims including test claim data, the test claim data including test claim enrollment statuses as the set of test claims has been processed by the claim processing server;

extracting a set of test claim features from the test claim data;

obtaining the test claim enrollment statuses associated with the set of test claim features;

applying the test claim features to the trained layered neural network to determine a predicted test claim enrollment status for each test claim;

comparing the test claim enrollment statuses to the associated predicted test claim enrollment statuses to identify discrepancies; and retraining the layered neural network based on the identified discrepancies.

13. A machine learning system for trained prediction of unenrollment in claim processing systems comprising:

a claim processing server comprising a claim memory and a claim processor in communication with said claim memory, said claim memory configured to store historic claims and pending claims; and a machine learning server comprising a machine learning memory for storing data, and a machine learning processor in communication with the machine learning memory, said machine learning processor configured to:

construct a layered neural network configured to be trained by claim features;

receive a plurality of historic claims from the claim processing server, at least one of the historic claims including historic claim data, the historic claim data including a claim enrollment status of enrolled or unenrolled;

extract a set of historic claim features from the historic claim data;

determine the claim enrollment status that is associated with the set of historic claim features;

train the layered neural network with the set of historic claim features and the claim enrollment status such that the trained layered neural network is configured to predict a claim enrollment status of another pending claim;

receive a pending claim including pending claim data from the claim processing server, wherein the pending claim lacks a claim enrollment status as the pending claim has not been processed by the claim processing server;

extract a set of pending claim features from the pending claim data;

apply the pending claim features to the trained layered neural network to determine a predicted claim enrollment status for the pending claim, wherein the predicted claim enrollment status is determined to be one of an enrolled status, an unenrolled status, or a not clear status, wherein the unenrolled status is associated with a failure to fill a prescription of the pending claim while the enrolled status is associated with a successful fulfillment of the prescription;

determine whether to fulfill the pending claim based on the predicted claim enrollment status;

on condition that the predicted claim enrollment status is determined to be the enrolled status, automatically submit the pending claim for processing by the claim processing server for fulfilling the pending claim;

on condition that the predicted claim enrollment status is determined to be the unenrolled status, automatically reject the pending claim; and on condition that the predicted claim enrollment status is determined to be the not clear status, automatically submit the pending claim for processing by the claim processing server for fulfilling the pending claim, define the layered neural network to include at least a recurrent neural network and a multilayer perceptron, wherein the set of pending claim features includes a therapy type, a location of service and claimant demographics.

14. The machine learning system of claim 13, wherein the machine learning processor is further configured to:

define the layered neural network to include a sigmoid activation layer; and apply the pending claim features to the sigmoid activation layer to determine a probability score indicating a likelihood of the predicted claim enrollment status, wherein the trained layered neural network is configured to determine the predicted claim enrollment status based on the likelihood of the predicted claim enrollment status.

15. The machine learning system of claim 13, wherein the machine learning processor is further configured to:

parse the historic claims to obtain a subset of the historic claim data that is non-categorized data;

process the subset of the historic claim data with the recurrent neural network to encode the non-categorized data within a plurality of categories; and obtain a portion of the set of historic claim features based on the encoded non-categorized data.

16. The machine learning system of claim 13, wherein the machine learning processor is further configured to:

train the layered neural network using a binary cross-entropy loss function that evaluates an accuracy of the trained layered neural network.

17. The machine learning system of claim 13, wherein said claim memory is configured to store a set of test claims, wherein the machine learning processor is further configured to:

receive the set of test claims including test claim data, the test claim data including test claim enrollment statuses as the set of test claims has been processed by the claim processing server;

extract a set of test claim features from the test claim data;

obtain the test claim enrollment statuses associated with the sets of test claim features;

apply the test claim features to the trained layered neural network to determine a predicted test claim enrollment status for each test claim;

compare the test claim enrollment statuses to the associated predicted test claim enrollment statuses to identify discrepancies; and retrain the layered neural network based on the identified discrepancies.

\* \* \* \* \*